Patented Mar. 22, 1932

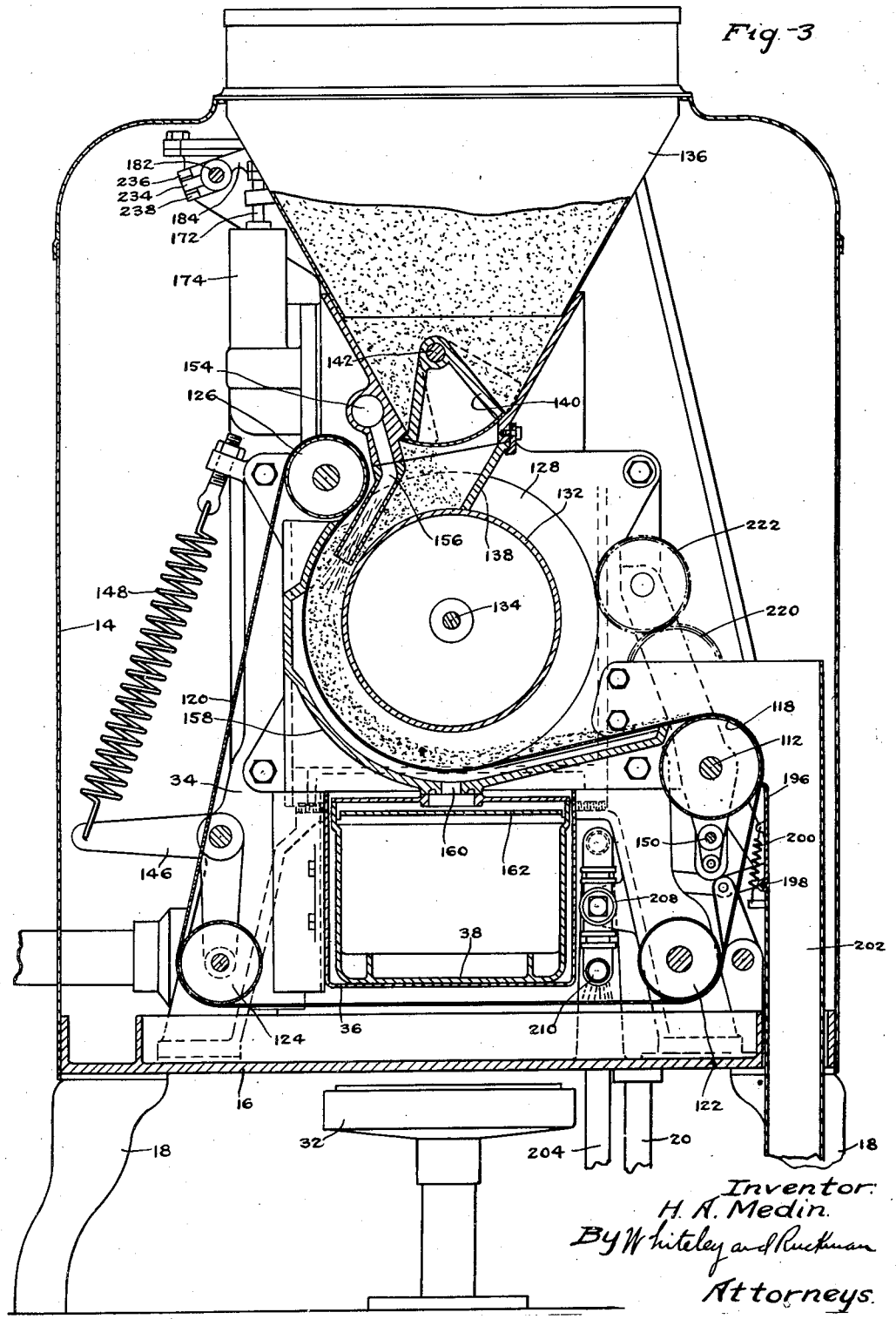

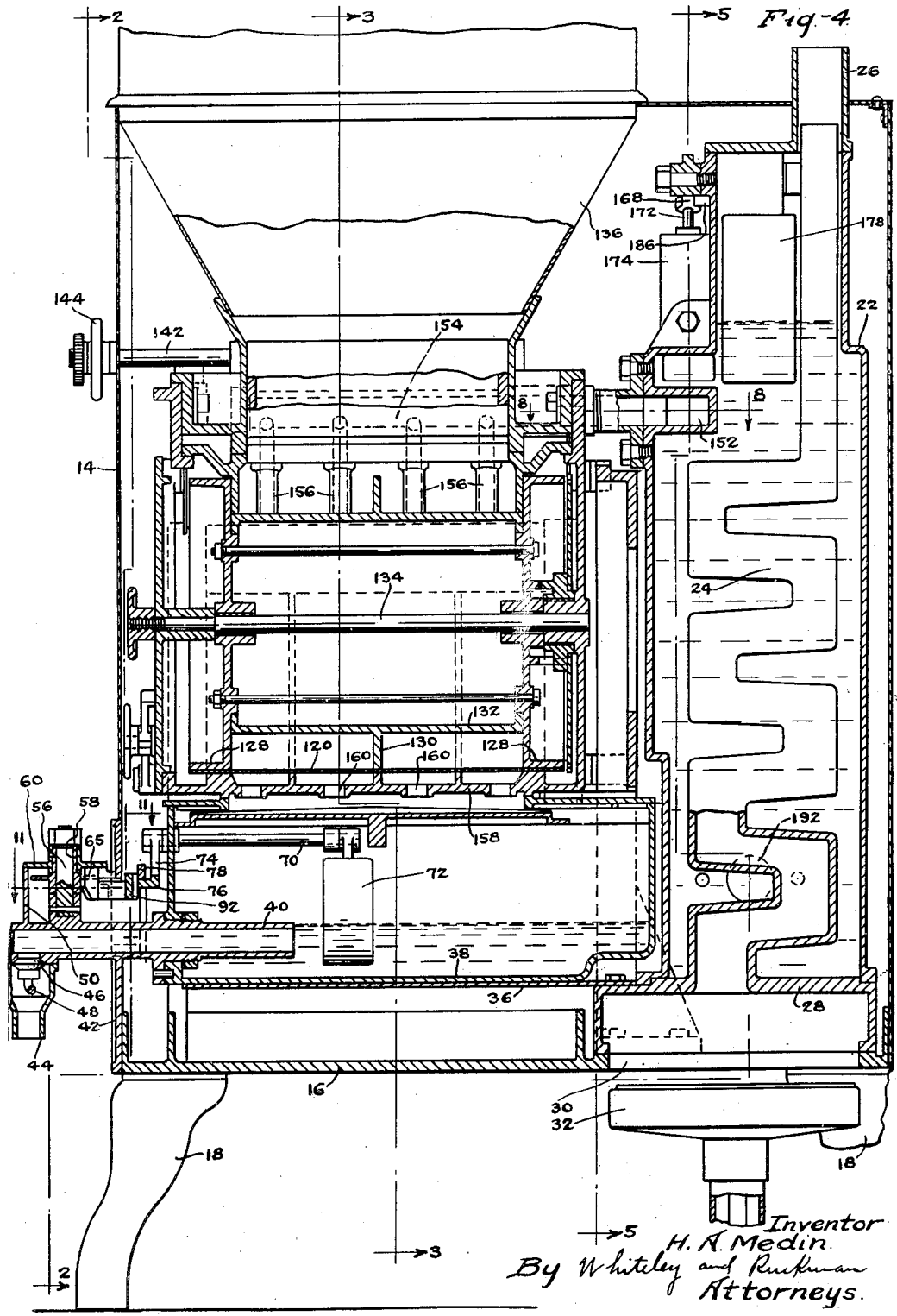

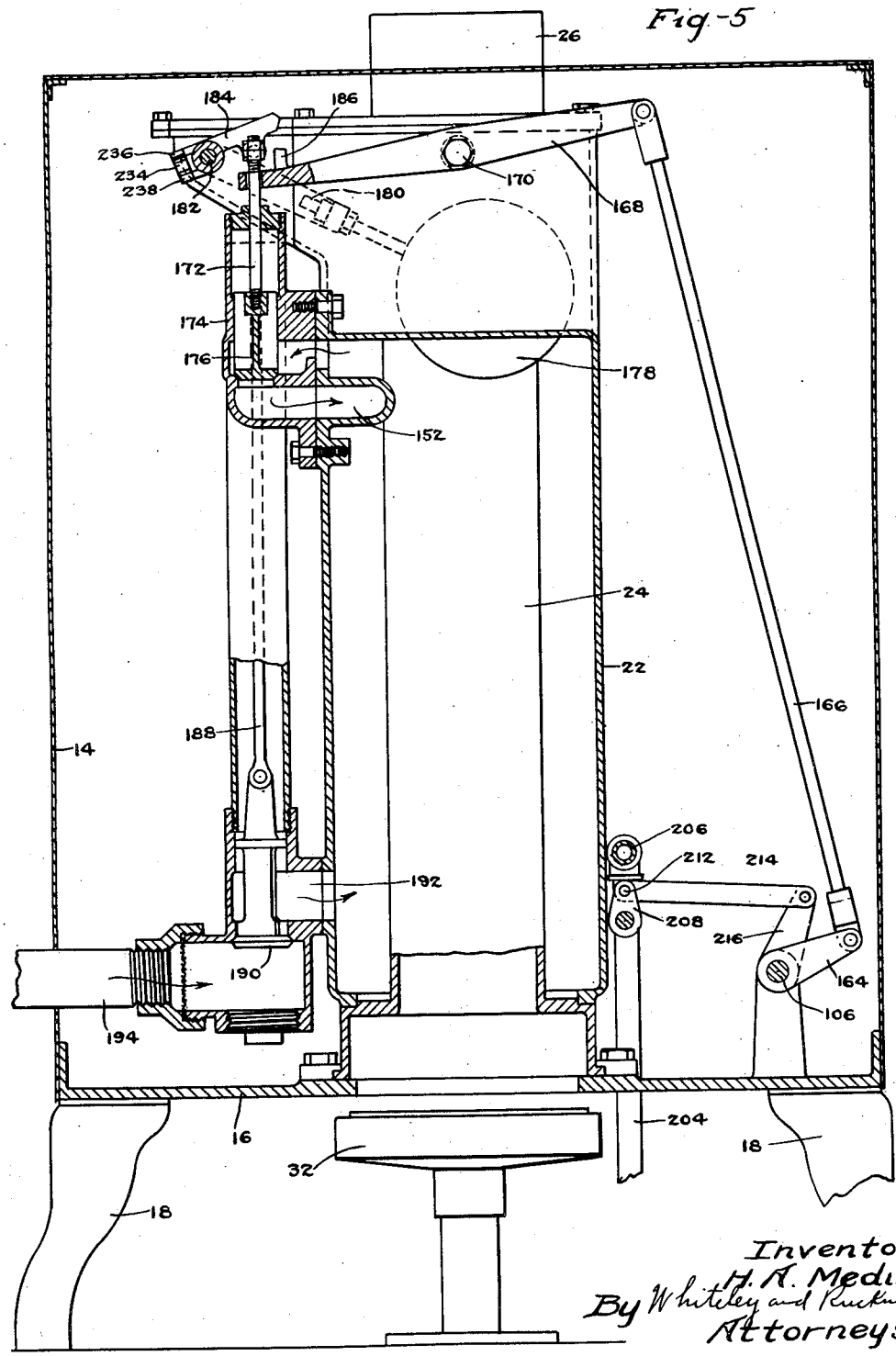

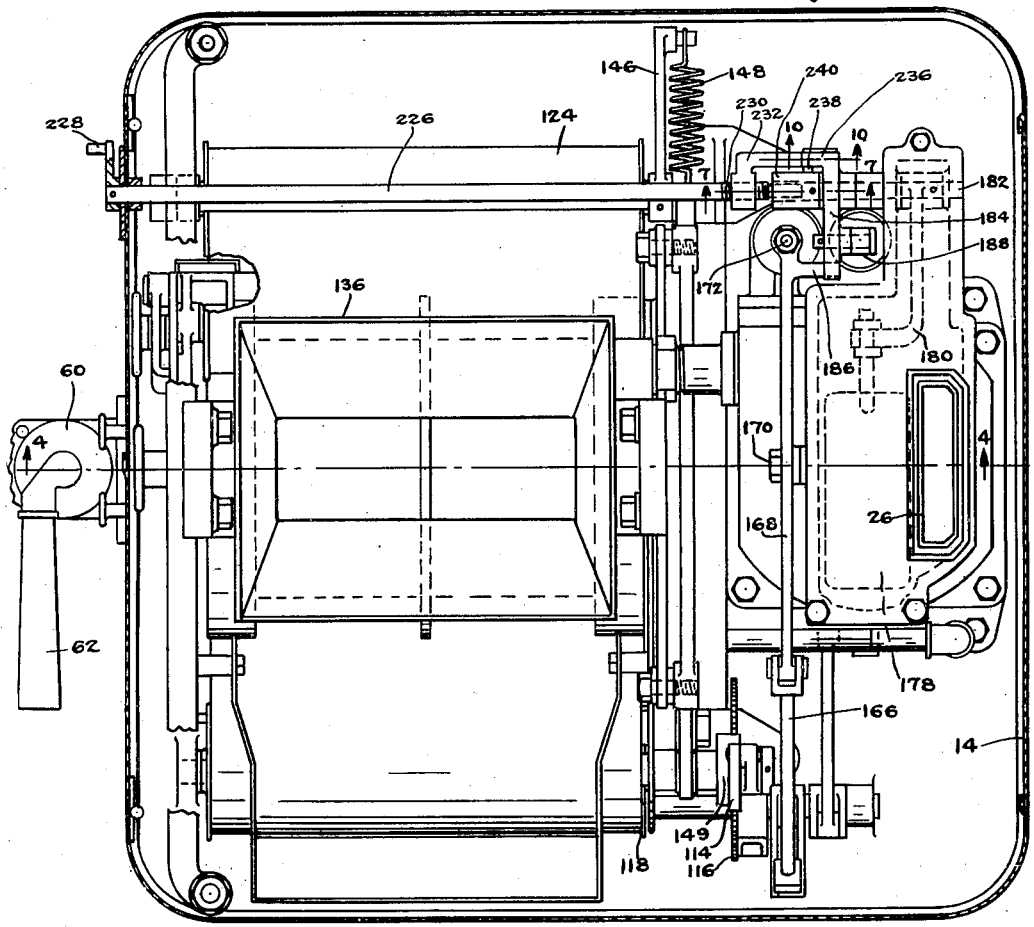
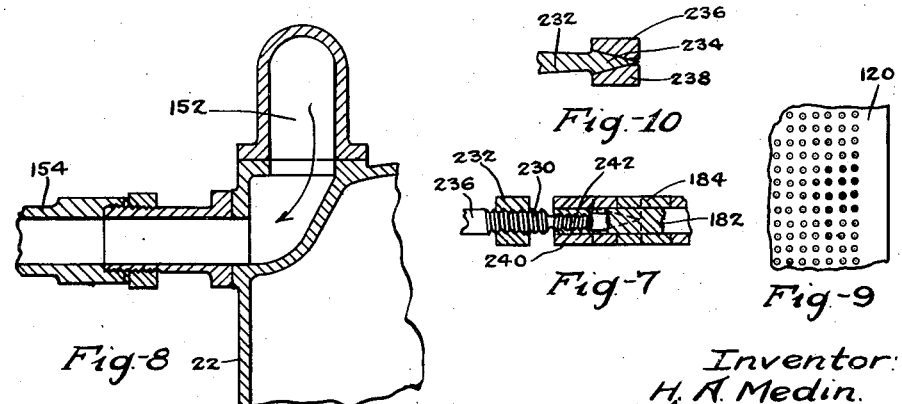

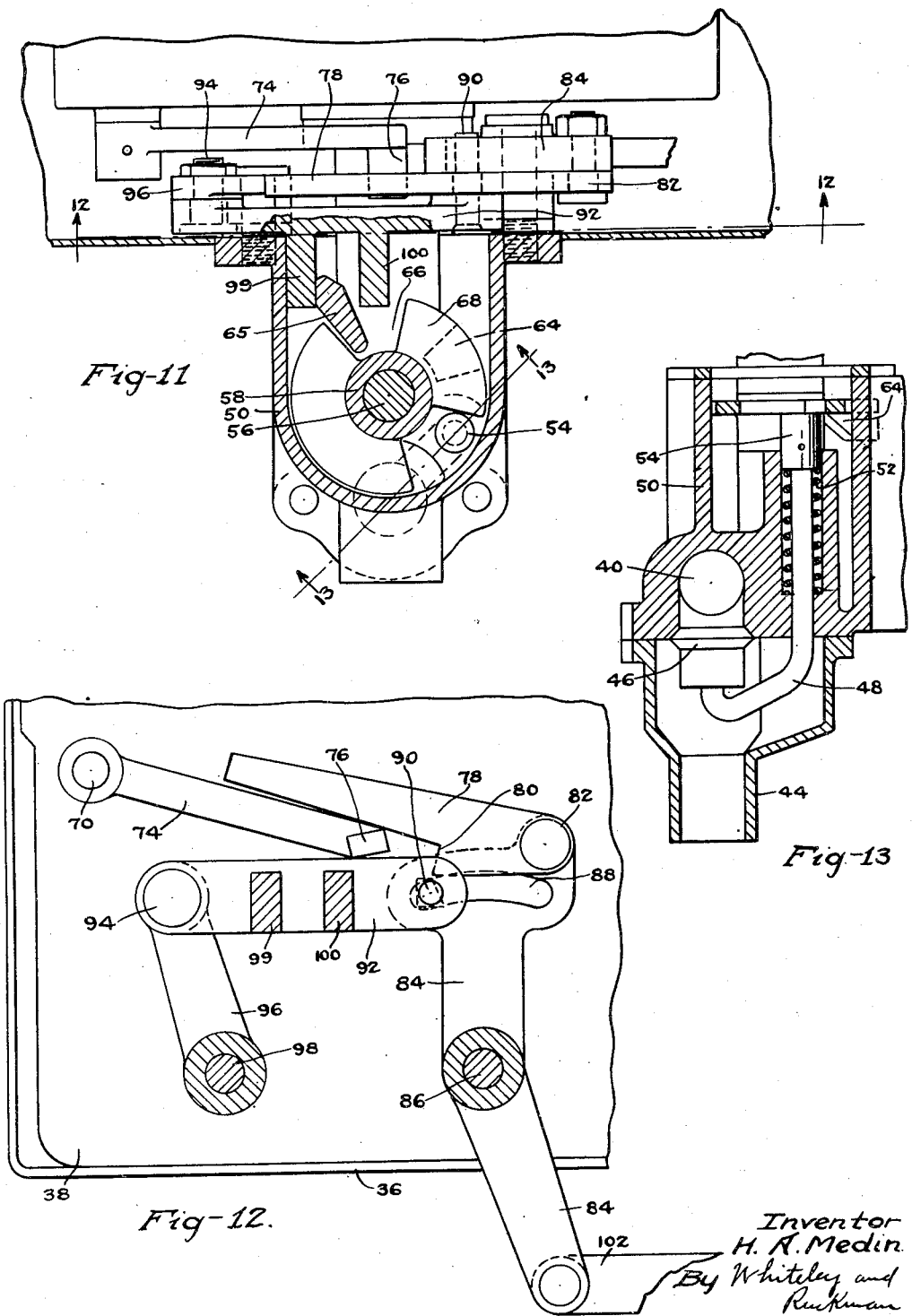

1,850,082

UNITED STATES PATENT OFFICE

HARRY A. MEDIN, OF MINNEAPOLIS, MINNESOTA

MACHINE FOR MAKING INFUSIONS OF COFFEE AND OTHER MATERIAL

Application filed November 25, 1929. Serial No. 409,578.

My invention relates to machines for making infusions of coffee and other material, and is in the nature of an improvement upon the machine disclosed in my application Serial Number 268,400 filed April 9, 1928. An object of the invention is to provide a machine which will feed ground coffee or other material in ribbonlike form and progressively subject it to the action of hot water or other infusing agent while in ribbonlike form. While intended more particularly for making coffee infusions, it will be obvious that the machine may be used for making infusions of other material such as tea, beeftea extract, etc. A special object of the invention is to control by the opening and closing of a draw-off faucet, the various operations involved in making the infusions such as feeding the ground coffee while disposed in ribbonlike form and subjecting the coffee to the action of boiling water.

The full objects and advantages of my invention will appear in connection with the detailed description thereof, and the novel features of my inventive idea will be particularly pointed out in the claims.

In the accompanying drawings which illustrate one of the forms in which my invention may be embodied,—

Figure 1:
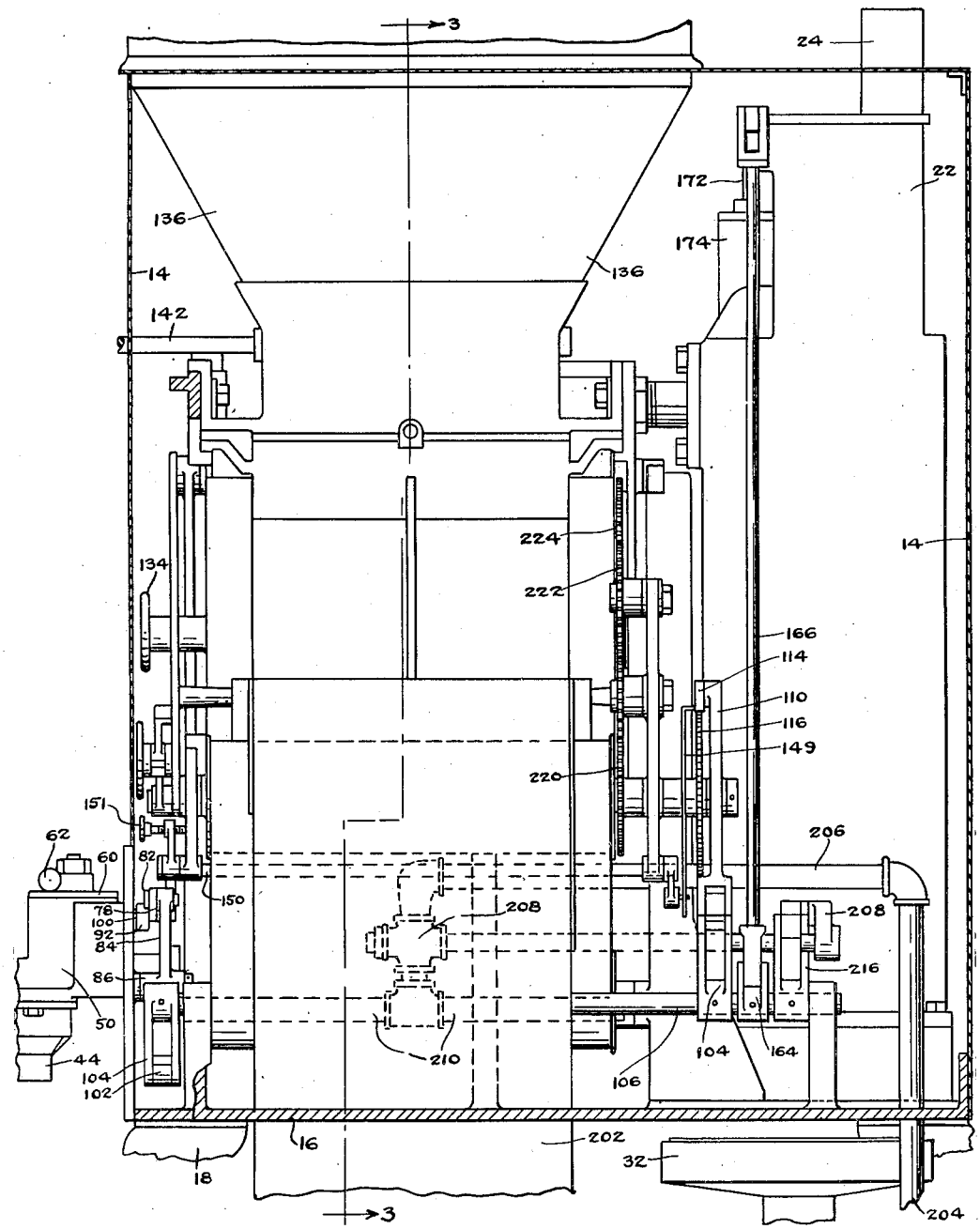
Figure 2:
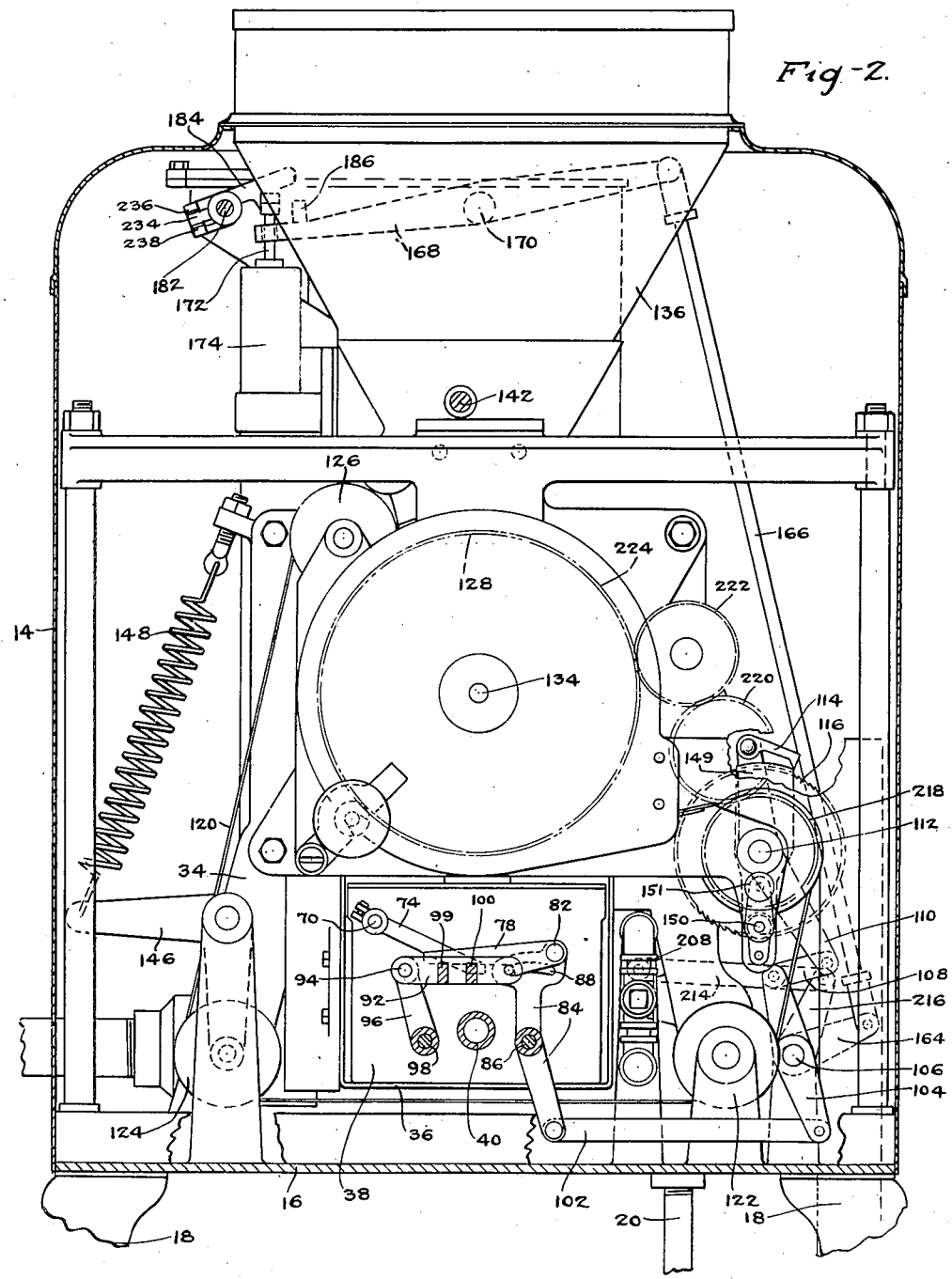

Fig. 1 is a side elevational view of the machine with a small portion in section. Fig. 2 is a view in vertical section on the line 2—2 of Fig. 4. Fig. 3 is a view in vertical section on the line 3—3 of Figs. 1 and 4. Fig. 4 is a view in vertical section on the line 4—4 of Fig. 6. Fig. 5 is a view in vertical section on the line 5—5 of Fig. 4. Fig. 6 is a top plan view partly in section. Fig. 7 is a detail view in section on the line 7—7 of Fig. 6. Fig. 8 is a detail view in section on line 8—8 of Fig. 4. Fig. 9 is a fragmentary plan view of a coffee-carrying belt. Fig. 10 is a detail view in section on the line 10—10 of Fig. 6. Fig. 11 (Sheet 7) is a view in horizontal section on the line 11—11 of Fig. 4. Fig. 12 is a view in section on the line 12—12 of Fig. 11. Fig. 13 is a view in section on the line 13—13 of Fig. 11.

Referring to the construction shown in the drawings, the numeral 14 designates a casing of suitable sheet metal extending up from a base 16 having a marginal upturned flange and which is mounted on legs 18. A drain pipe 20 leads out from the inner surface of the base 16. Within the rear of the casing 14, there is a water tank 22 which may be heated in any suitable manner. As shown, there is a sinuous tubular member 24 which extends upwardly through the tank 22. The upper end of the tubular member 24 opens into a stack 26 which is secured to the upper end of the tank 22. The lower end of the tank 22 fits in liquid-tight manner upon the enlarged lower end 28 of the tubular member 24 as shown in Fig. 4. Underneath the member 28, the base 16 is provided with an opening 30 below which is placed a heating element such as a gas burner 32 so that heat may pass up through the tubular member 24 and heat the water in the tank 22. Within the casing 14, a frame designated in general by the numeral 34 extends up from the base 16. A piece of sheet metal 36 which as shown in Fig. 3 is U-shaped in cross-section is secured to the frame 34 and to the member 28 as shown in Fig. 4 so as to be held in spaced relation somewhat above the base 16. Supported by the plate 36, there is a receptacle 38 which as shown in Fig. 4 may be pulled out of the casing 14 when it is desired to clean this receptacle. The front of the receptacle 38 is provided with a faucet which includes a tube 40 extending outwardly from the casing with a flange 42 attached thereto which closes the withdrawal opening in the casing when the receptacle 38 is in place. A discharge pipe 44 extends downwardly from the outer end of the tube 40. The passage from the tube into the spout 44 is provided with a valve seat adapted to be closed by a valve 46 to the lower end of which is secured a rod 48 which is turned upwardly and passes through a socket formed in a housing member 50 as shown in Fig. 13. A coiled spring 52 placed between the bottom of this socket and a collar 54 secured to the upper end of the rod 48 normally holds valve 46 in closed position. As shown in Fig. 4, an upwardly extending stud 56 is secured to the tube 40. Rotatably mounted on the stud 56, there is a sleeve 58 the upper end of which extends through a plate 60 resting upon the housing 50. An operating handle 62 is secured to the sleeve 58 and the latter carries a cam 64 which as will be understood from Fig. 11 impinges on the top of the collar 54 when the handle 62 is turned to open the valve 46 in opposition to the tension of the spring 52. The plate 60 carries a depending lug 65 which is disposed in a notch 66 formed in a flange 68 extending out from the sleeve 58. A horizontal rod 70 rotatably supported in the upper portion of the receptacle 38 has a depending float 72 secured to one end thereof. The other end of the rod 70 extends outside the receptacle 38 and carries a crank arm 74 having an outturned projection 76 at its free end. When the receptacle 38 is about full, the float 72 causes the projection 76 to hold up an arm 78 into the position shown in Fig. 12. The arm 78 is provided with a shoulder 80 and is pivoted at 82 to the enlarged upper end of a lever 84 which is intermediately pivoted at 86. The enlarged upper end of the lever 84 contains an arcuate slot 88 in which a pin 90 is adapted to slide when the device is in the position shown in Fig. 12. However, when the receptacle is partly empty, the float 72 drops and allows the arm 78 to drop into the position shown in Figs. 2 and 4. The pin 90 is secured to one end of a link 92 whose other end is connected by a pivot 94 with the upper end of an arm 96 whose lower end is pivoted at 98. The link 92 carries two outstanding lugs 99 and 100 spaced from each other and between which the lug 65 previously referred to fits as shown in Fig. 11. If now the handle 62 is turned to open the valve 46, the lug 65 will move the link 92 toward the right as viewed in Figs. 2 and 12. If the receptacle 38 is nearly full with the float 72 up, the link 92 will now move without operating the lever 84 as will be understood from Fig. 12. If however, the receptacle 38 is partly empty, the shoulder 80 will be engaged and the upper end of the lever 84 moved toward the right as will be understood from Fig. 2. This will cause the lower end of the lever 84 to move toward the left and pull with it a link 102 which is pivotally attached thereto. The other end of the link 102 is connected to the lower end of a lever 104 which is secured at its middle portion to a shaft 106. The upper end of the lever 104 is connected by a link 108 with the lower end of a lever 110 which is pivotally mounted at its middle portion upon a shaft 112. The upper end of the lever 110 carries a pawl 114 which is adapted to engage the teeth of a ratchet wheel 116 secured to the shaft 112. A roller 118 carried by the shaft 112 constitutes a feed roller for a foraminous endless belt 120 shown in plan in Fig. 9. This belt as shown in Fig. 3 passes around guide rollers 122, 124 and 126 and engages end flanges 128 and in the form shown herein also an intermediate flange 130 of a drum 132 carried by a shaft 134. The drum 132 is placed underneath a hopper 136 for holding ground coffee, this hopper being supported in the upper portion of the casing 14. A directing member 138 extends from the bottom of the hopper 136 into engagement with the drum 132. A shut-off valve 140 is secured to a shaft 142 mounted toward the lower end of the hopper. A knob 144 secured to the shaft 142 serves to turn the valve 140 into the desired open position for allowing the ground coffee to pass out of the hopper and be delivered upon the belt 120 to spread out thereon in the form of a ribbon. The roller 124 serves as a tension roller to keep the belt 120 under tension, it being noted that this roller is mounted in the lower end of a bell crank 146 whose upper arm is held upwardly by a coiled spring 148. A plate 149 adjustably mounted above the ratchet wheel 116 serves to regulate the time of engagement of the pawl 114 with the ratchet wheel and hence determines the extent of feeding movement of the endless belt 120 for each step. The plate 149 as will be understood from Fig. 2 has a downwardly extending flange which is mounted on a pivot rod 150 while a set screw 151 is provided for holding the plate in its adjusted position. From the previous description, it will be understood that if the receptacle 38 is nearly full of made-up coffee and the faucet is open to obtain coffee, the turning of the faucet will not operate the endless belt. However, if the receptacle 38 is partly empty, then the belt will be given a step movement each time the faucet is closed after it has been opened to fill a cup with made-up coffee.

In order to subject the ground coffee to the action of boiling water, the upper portion of the tank 22 is connected by a passage 152 with a pipe 154 as will be understood from Figs. 4 and 8. The pipe 154 is provided with a plurality of nozzles 156 which extend downwardly as shown in Fig. 3 to discharge boiling water upon the ground coffee which passes to the belt 120 and lies thereon in ribbonlike form. A guard member 158 extends part way around the belt 120 at this place, and this guard has a bottom portion which inclines toward perforations 160 therein so that the infusion of coffee falls upon a baffleplate 162 in the upper portion of the receptacle 38 and passes over the margins thereof into the receptacle. As shown in Figs. 2 and 5, an arm 164 is secured to the shaft 106 previously referred to as being operated by the link 102. The arm 164 is connected by a link 166 with an arm of lever 168 intermediately pivoted at 170 and whose other end contains a perforation through which a rod 172 passes loosely. The rod 172 extends down into a tube 174 which is provided with a valve seat for a valve 176, this valve controlling the passageway between the tank 22 and the delivery pipe 154. It will now be understood that if the float 72 is in downward position in the receptacle 38, the valve 176 will be opened and hot water will flow past this valve upon the ground coffee which is delivered to the belt 120. A float 178 placed in the upper portion of the tank 22 is adjustably secured to a rod 180 which in turn is secured to a pivot rod 182 as shown in Fig. 6. Also secured to the rod 182 there is an arm 184 whose free end extends over a projection 186 extending out from the lever 168. The upper end of a downwardly extending rod 188 is pivotally secured to a projection on the arm 184. The lower end of the rod 188 carries a valve 190 which cooperates with a valve seat in a passageway 192 leading into the tank 22 as shown in Fig. 5. The passageway 192 connects past the valve 190 with a water supply pipe 194. It will now be understood that when the float 178 falls, the arm 184 swings down and moves the rod 188 downwardly to open the valve 190 so that water may flow into the tank 22. Also assuming that the float 178 is down, and the link 166 is pulled downwardly, not only will the valve 176 be opened to discharge hot water upon the ground coffee, but by engagement of the projection 186 on 184, the valve 190 will be closed so as to prevent the hot water in the tank 22 from being subjected to the pressure in the water supply system. Therefore, regardless of whether the float 178 is up or down, the coffee which is delivered to the belt 120 will always be subjected to a gentle flow of hot water from the tank 22.

By referring to Fig. 3 it will be seen that there is a scraper blade 196 pivoted at 198 and held by a spring 200 in engagement with the belt 120 as it passes down from the roller 118. This blade serves to remove coffee grounds from the belt and assists in causing these grounds to be delivered to a chute 202. In order to wash the belt 120 after the grounds have been scraped therefrom, I provide a vertical water supply pipe 204 connected to a horizontal pipe section 206 as shown in Fig. 1. The pipe section 206 is connected to a valve casing 208 which in turn is connected to a horizontal pipe 210 extending transversely above the belt 120 as shown in Fig. 3. The lower side of the pipe 210 is perforated for spraying water upon the belt 120. The water after it has washed the belt, passes into the flanged base 16 and escapes through the drain pipe 20. The valve in the casing 208 has a stem 212 which as best shown in Fig. 5 is connected by a link 214 to an arm 216 secured to the shaft 106 previously referred to. It will now be obvious that when the faucet is opened to fill a cup with coffee, the pull on the link 102 will cause the link 214 to be pulled and open the valve in the casing 208. While as previously stated, the roller 118 constitutes a drive roller for the belt 120, I also prefer to drive the drum 132. For this purpose, it will be seen by referring to Figs. 2 and 3 that gearing is interposed between the shaft of the roller 118 and the shaft of the drum 132 as follows: A gear 218 secured to the shaft 112 meshes with a gear 220 which in turn meshes with a gear 222 and the latter gear meshes with a gear 224 secured to the shaft 134.

It is desirable to adjust the operative position of the arm 184 without changing the operative position of the float 178 with relation to the tank 22. In order to accomplish this result, I provide mechanism which will now be set forth. Extending through the casing 14, as shown in Fig. 6, there is a rotatable rod 226 held from sliding movement and whose outer end is provided with a handle 228 by which this rod may be turned. Toward its inner end, the rod 226 has a right hand thread 230 which cooperates with a nut member 232 which is extended laterally toward the right as viewed in Fig. 6 and formed with a wedge-shaped end 234 as shown in Fig. 10. This wedge fits between an inclined surface formed on the outer end 236 of the arm 184 and an inclined surface formed on a projection 238 carried by a collar 240 secured to the rod 182. The extreme inner end of the rod 226 is provided with a left hand thread 242 which cooperates with an internal thread formed in the hollowed out inner end of the rod 182. When the rod 226 is turned in the proper direction to feed the nut member 232 and the wedge 234 toward the right, the inner end of the arm 184 will be moved downwardly. At the same time, on account of the left hand thread 242 the proper operative position of the float 178 will be maintained. When the rod 226 is turned in the opposite direction, the reverse operation occurs, the inner end of the arm 184 being moved upwardly without affecting the operative position of the float.

The operation of the machine may be summarized as follows. Ground coffee is placed in the hopper 136 and the shutoff device 140 is opened an extent depending upon how fast it is desired to deliver the coffee from the hopper. The tank 22 will be kept supplied with water to substantially the proper level by the rise and fall of the float 178 which controls the valve 190, the water in the tank being heated by the heating device associated therewith. When the receptacle 38 is nearly full of madeup coffee, the operation of the faucet in drawing off cups of coffee has no effect to feed the coffee carrying belt 120 nor to cause flow of hot water for making the infusion, nor to cause flow of water for washing away spent material. However, when the float 72 drops sufficiently due to the drawing off of cups of coffee, the opening of the faucet to draw off a cup of coffee causes the pawl 114 to pass backwardly over the teeth of the ratchet wheel 116 so that the closing movement of the faucet causes the pawl to engage the ratchet wheel and turn it to an extent determined by the setting of the plate 149, thereby moving forwardly the belt 120 carrying with it a layer of ground coffee in ribbonlike form. Furthermore, with the float 72 in lowered position, opening movement of the faucet pulls down on the link 166 and opens the valve 176 so that hot water will flow through the nozzle 156 and pour over the ground coffee which has been delivered from the hopper. It will be understood that the operating connections are so arranged that the amount of the infusing water which is delivered each time in substantially the same as that required for one cup of coffee. At the same time, if the float 178 is down so that the valve 190 is in open position, the engagement of the lever projection 186 with the arm 184 will lift the valve 190 into closed position so that the water in the hotwater tank is not under the pressure of the water supply system. When the faucet is closed after the filling of a cup, the parts will return to original position. Also with the float 72 in lowered position, opening movement of the faucet opens the valve which controls the flush pipe 210 while closing of the faucet closes this valve.

I claim:

1. In a machine for making infusions of coffee and other material, the combination of mechanism for feeding the material to be infused, mechanism for subjecting the material to the action of an infusing agent, a receptacle into which the infusion is delivered, a draw-off faucet for said receptacle, said faucet including a movable member and movable mechanical connections between said member and said subjecting mechanism for operating the latter by operation of said member.

2. In a machine for making infusions of coffee and other material, the combination of mechanism for feeding the material to be infused, mechanism for subjecting the material to the action of an infusing agent, mechanism for washing away spent material, a receptacle into which the infusion is delivered, a draw-off faucet for said receptacle, said faucet including a movable member and movable mechanical connections between said member and said washing mechanism for operating the latter by operation of said member.

3. In a machine for making infusions of coffee and other material, the combination of mechanism for feeding the material to be infused, mechanism for subjecting the material to the action of an infusing agent, a receptacle into which the infusion is delivered, a draw-off faucet for said receptacle, said faucet including a movable member, movable mechanical connections between said member and said feeding mechanism for operating the latter by operation of said member, and connections between said member and said subjecting mechanism for operating the latter by operation of said member.

4. In a machine for making infusions of coffee and other material, the combination of mechanism for feeding the material to be infused, mechanism for subjecting the material to the action of an infusing agent, mechanism for washing away spent material, a receptacle into which the infusion is delivered, a draw-off faucet for said receptacle, said faucet including a movable member, movable mechanical connections between said member and said feeding mechanism for operating the latter by operation of said member, and connections between said member and said washing mechanism for operating the latter by operation of said member.

5. In a machine for making infusions of coffee and other material, the combination of mechanism for feeding the material to be infused, mechanism for subjecting the material to the action of an infusing agent, mechanism for washing away spent material, a receptacle into which the infusion is delivered, a draw-off faucet for said receptacle said faucet including a movable member, movable mechanical connections between said member and said subjecting mechanism for operating the latter by operation of said member, and movable mechanical connections between said member and said washing mechanism for operating the latter by operation of said member.

6. In a machine for making infusions of coffee and other material, the combination of mechanism for feeding the material to be fused, mechanism for subjecting the material to the action of an infusing agent, mechanism for washing away spent material, a receptacle into which the infusion is delivered, a draw-off faucet for said receptacle, said faucet including a movable member movable mechanical connections between said member and said feeding mechanism for operating the latter by operation of said member, connections between said member and said subjecting mechanism for operating the latter by operation of said member and movable mechanical connections between said member and said washing mechanism for operating the latter by operation of said member.

7. In a machine for making infusions of coffee and other material, the combination of mechanism for feeding the material to be infused, mechanism for subjecting the material to the action of an infusing agent, a receptacle into which the infusion is delivered, a draw-off faucet for said receptacle, said faucet including a movable member and movable mechanical connections between said member and said subjecting mechanism for operating the latter by opening movement of said member.

8. In a machine for making infusions of coffee and other material, the combination of mechanism for feeding the material to be infused, mechanism for subjecting the material to the action of an infusing agent, mechanism for washing away spent material, a receptacle into which the infusion is delivered, a draw-off faucet for said receptacle, said faucet including a movable member, of movable mechanical connections between said member and said washing mechanism for operating the latter by operation of said member, and means for rendering said connections inoperative when said receptacle is nearly full.

9. In a machine for making infusions of coffee and other material, the combination of mechanism for feeding the material to be infused, mechanism for subjecting the material to the action of an infusing agent, a receptacle into which the infusion is delivered, a draw-off faucet for said receptacle, said faucet including a movable member, movable mechanical connections between said member and said feeding mechanism for operating the latter by operation of said member, a float in said receptacle, and means operated by said float which renders said connections inoperative when said receptacle is nearly full.

10. In a machine for making infusions of coffee and other material, the combination of mechanism for feeding the material to be infused, mechanism for subjecting the material to the action of an infusing agent, a receptacle into which the infusion is delivered, a draw-off faucet for said receptacle, said faucet including a movable member, movable mechanical connections between said member and said subjecting mechanism for operating the latter by operation of said member, a float in said receptacle, and means operated by said float which renders said connections inoperative when said receptacle is nearly full.

11. In a machine for making infusions of coffee and other material, the combination of mechanism for feeding the material to be infused, mechanism for subjecting the material to the action of an infusing agent, mechanism for washing away the spent material, a receptacle into which the infusion is delivered, a draw-off faucet for said receptacle, said faucet including a movable member, movable mechanical connections between said member and said washing mechanism for operating the latter by operation of said member, a float in said receptacle, and means operated by said float which renders said connections inoperative when said receptacle is nearly full.

12. In a machine for making infusions of coffee and other material, the combination of a tank containing water under an effective head, a float in said tank, a valve operated by said float for cutting off the supply of water to said tank when the latter is nearly full, a heating device for said tank, mechanism for feeding the material to be infused, a pipe connection with the upper portion of said tank for delivering hot water upon the material which is being fed, a normally closed valve in said pipe connection, a receptacle into which the infusion is delivered, a draw-off faucet for said receptacle, said faucet including a movable member, movable mechanical connections between said member and said normally closed valve for opening the latter by operation of said member, a float in said receptacle, and means associated with said float which renders said connections inoperative when said receptacle is nearly full.

13. In a machine for making infusions of coffee and other material, the combination of a tank containing water under an effective head, a float in said tank, a valve operated by said float for cutting off the supply of water to said tank when the latter is nearly full, a heating device for said tank, mechanism for feeding the material to be infused, a pipe connection with the upper portion of said tank for delivering hot water upon the material which is being fed, a normally closed valve in said pipe connection, a receptacle into which the infusion is delivered, a draw-off faucet for said receptacle, said faucet including a movable member, movable mechanical connections between said member and said normally closed valve for opening the latter by operation of said member, means associated with said float which renders said connections inoperative when the said receptacle is nearly full, a float in said receptacle, and means operated by said connections which close said first mentioned valve when the latter is in open position.

In testimony whereof I hereunto affix my signature.

HARRY A. MEDIN.